United States Patent [19]

Polyakov et al.

[11] Patent Number: 4,825,698

[45] Date of Patent: May 2, 1989

[54] METHOD OF MEASURING DIRECTION OF MECHANICAL VIBRATIONS

[75] Inventors: Arkady V. Polyakov; Genrikh A. Speransky, both of Moscow, U.S.S.R.

[73] Assignee: Nauchno Proizvodstvennoe Obiedinenie Stroitelnogo I Dorozhnogo Mashinostroenia, Moscow, U.S.S.R.

[21] Appl. No.: 942,296

[22] Filed: Dec. 16, 1986

[30] Foreign Application Priority Data

Dec. 17, 1985 [SU] U.S.S.R. .................. 3990478

[51] Int. Cl.⁴ .............................................. G01H 9/00
[52] U.S. Cl. ............................................... 73/649
[58] Field of Search ............ 73/649, 660, 1 DV, 655, 73/570

[56] References Cited

U.S. PATENT DOCUMENTS

| | | | |
|---|---|---|---|
| 1,673,949 | 6/1928 | Rathbone | 73/649 |
| 2,261,838 | 11/1941 | Allendorff | 73/660 |
| 4,364,275 | 12/1982 | Lamar | 73/649 |

Primary Examiner—Stewart J. Levy
Assistant Examiner—Robert P. Bell
Attorney, Agent, or Firm—Fleit, Jacobson, Cohn & Price

[57] ABSTRACT

A method of measuring the direction of mechanical vibrations, in which a plurality of points are marked on the surface of a vibrating object along the arc of a circle of a given radius at a constant pitch selected from a range of 1.2 to 1.8 of the amplitude of mechanical vibrations, forming a circular scale and while moving together with the vibrating object making up, depending on the shape of a trajectory of mechanical vibrations, stroboscopically still equal segments of a straight line or patterns. A group of straight line adjacent segments disposed at a minimum distance in a radial direction or patterns having a maximum overlapping and a radially arranged axis of symmetry is visually defined. An ordinal number is determined of one or two straight line segments or of one or two patterns through which the axis of symmetry passes, and the direction of mechanical vibrations is measured on the circular scale by an angle corresponding to this ordinal number.

4 Claims, 2 Drawing Sheets

METHOD OF MEASURING DIRECTION OF MECHANICAL VIBRATIONS

FIELD OF THE INVENTION

The invention relates to means for measuring mechanical quantities by an optical method and is more particularly concerned with methods of measuring the direction of mechanical vibrations.

The invention may be used for measuring and checking parameters of vibrations in investigation and adjustments of vibration machines used for compaction of soils and viscous materials, pile driving, conveying, washing, dehydration, classification and weight separation of loose materials, grinding and other processes, as well as vibromotors, vibropercussion tools, laboratory equipment for preparation of samples, and vibrostands.

BACKGROUND OF THE INVENTION

Widely known at present is a method of measuring the direction o f mechanical vibrations residing in that secured to a vibrating object is a spring-loaded needle which when vibrating traces a trajectory of the object vibrations on a coated glass fixedly installed along the base line which is a reference line for taking readings of angles. An angle between a straight line passing through the extreme, most distant, points of the trajectory and the base line characterizes the direction of vibrations and is measured with a protractor.

Said method is characterized by a low accuracy due to an error introduced at setting of the protractor relative to the base line, a small measurement base between the extreme points of the trajectory and an error in defining of the extreme points in case of elliptic vibrations. A total error amounts to ±6°. Another disadvantage of the method resides in a tedious measuring procedure due to complexity in securing the needle on an object and the glass on a stand.

Because of the above-mentioned disadvantages the use of said method fails to provide the rapid accomplishment of periodical checks on the direction of mechanical vibrations being one of the main parameters of vibration machines and to adjust the vibration machine with an ample accuracy for an optimum mode of operation with regard to this parameter.

SUMMARY OF THE INVENTION

It is an object of the invention to provide a method of measuring the direction of mechanical vibrations ensuring a high degree of accuracy in measurements.

It is another object of the invention to provide rapidity in taking measurements.

The essence of the invention consists in that in a method of measuring the direction of mechanical vibrations in vibration machines, according to the invention, a plurality of points are marked on the surface of a vibrating object along the arc of a circle of a given radius at a constant pitch selected from a range of 1.2 to 1.8 of the amplitude of mechanical vibrations, forming a circular scale and while moving together with the vibrating object making up, depending on the shape of a trajectory of mechanical vibrations, stroboscopically still equal segments of a straight line or patterns, a group of the straight line adjacent segments disposed at a minimum distance in a radial direction or patterns having a maximum overlap and a radially arranged axis of symmetry is visually defined, an ordinal number is determined of one or two straight line segments or of one or two patterns through which the axis of symmetry passes, and the direction of mechanical vibrations is measured on the circular scale by the angle corresponding to this ordinal number.

It is desirable that in a method of measuring the direction of mechanical vibrations at taking the measurement of the direction of mechanical vibrations approximately equal to 90°, the circular scale be arranged so relative to a preliminarily selected base line passing through the center of the circular scale circumference that at least two extreme points from the points forming divisions of the circular scale are disposed on the other side of the base line relative to the remaining points.

The method of measuring the direction of mechanical vibrations according to the invention makes it possible to take the measurements rapidly and to a high degree of accuracy.

BRIEF DESCRIPTION OF THE DRAWINGS

Further objects and advantages of the invention will appear from the following description in which the preferred embodiments are set forth in detail in conjunction with the accompanying drawings, wherein.

DETAILED DESCRIPTION OF THE INVENTION

A method of measuring the direction of mechanical vibrations used for measuring and checking the parameters of vibrations in investigation and ajustments of vibration machines resides in the following.

A plurality of points 1 (FIG. 1) are marked on the surface of a vibrating point along the arc of a circle of a given radius at a constant pitch h selected from a range of 1.2 to 1.8 of the amplitude of mechanical vibrations, forming a circular scale. The radius of the circle is selected from the product of the pitch h by the number of sclae divisions corresponding to the number of the points 1 divided by $\pi$.

The scale comprises a base line 2 passing in the described embodiment through a center 3 of the circle, and two auxiliary points 4.

Figure 2:
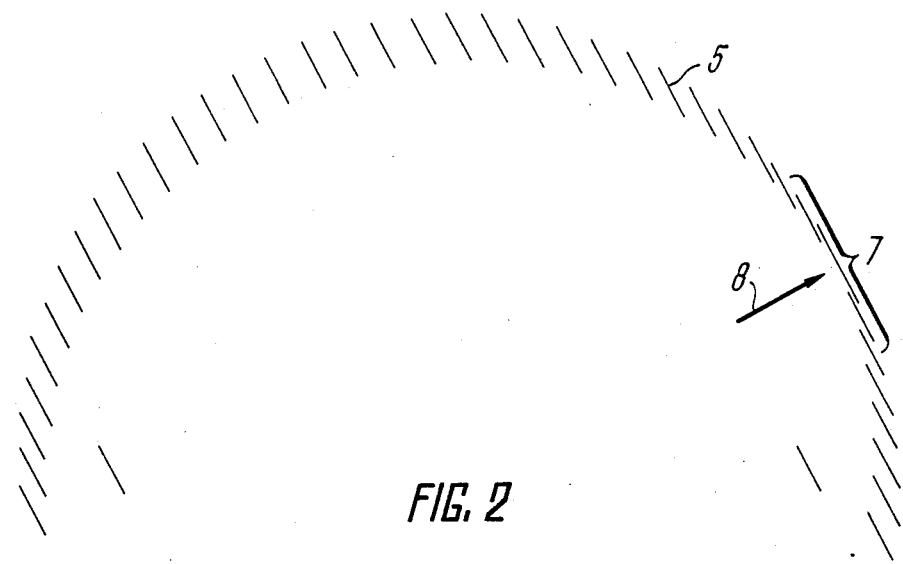
FIG. 2 illustrates a plurality of segments of straight lines made up of points during rectilinear vibrations of an object, according to the invention.

Depending upon the shape of a trajectory of mechancial vibrations, the points 1 while moving together with the vibrating object form stroboscopically still straight line segments 5 (FIG. 2) of equal length and in case of elliptic vibrations, form patterns 6 further referred to as the ellipses 6.

Figure 1:
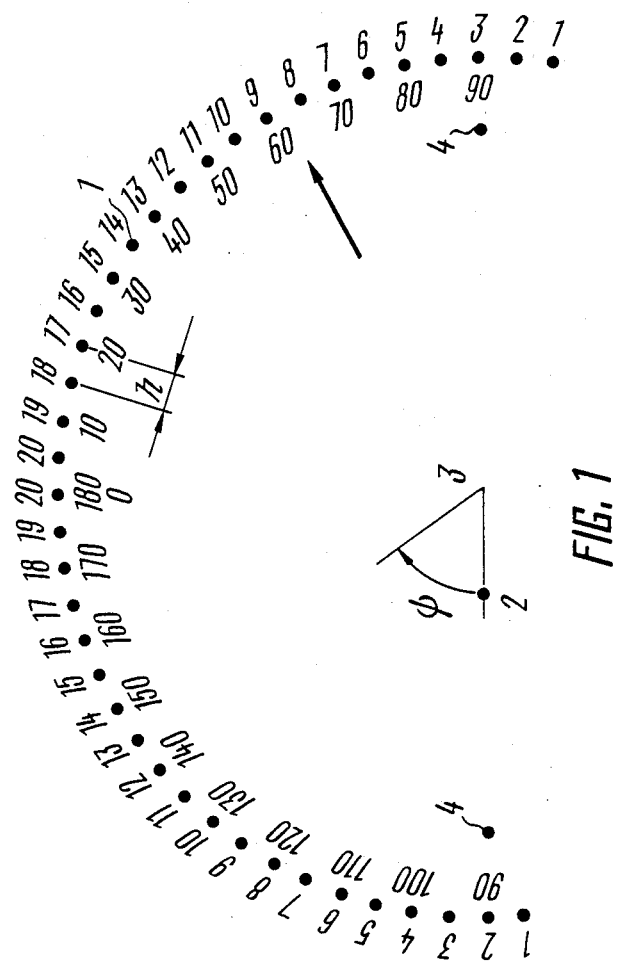
FIG. 1 illustrates a plurality of points which are disposed along the arc of a circle at a constant pitch, form a circular scale and are assigned ordinal numbers, and an angle in degrees, according to the invention.

A scale formed by the points 1 (FIG. 1) is plotted for example, on a card secured to the vibrating object. A card is also made with a similar scale on which each point 1 is assigned an ordinal number. It is preferred that ordinal numbers should increase from the scale ends towards the scale center, as is illustrated in FIG. 1, from the first to the twentieth. A designation of each point 1, i.e. the scale division in degrees is also marked on this scale counting off from the base line 2, for example, from 90° at one end of the scale to 0° at the center thereof, and from 90° to 180° from the other end of scale.

In case of rectilinear vibrations, visually defined is a group 7 (FIG. 2) of the straight line adjacent segments 5 disposed at a minimum distance in a radial direction and having a radially arranged axis 8 of symmetery shown by an arrow.

The axis 8 of symmetry may conveniently be determined by the value of overlapping of the straight line adjacent segments 5 of the group 7. As is seen from FIG. 2 the axis 8 of symmetry passes through the two overlapping straight line segments 5. Ordinal numbers of these two straight line segments 5 are determined by counting off from the nearest end of the scale and measuring the direction of mechanical vibrations by the angle corresponding to this ordinal number on the circular scale.

By a direction of mechanical vibrations is implied an angle $\Psi$ of inclination of the straight line segments 5 relative to the base line 2 (FIG. 1).

As is seen from FIG. 1, ordinal numbers eight and nine correspond to the overlapping straight line segments 5 (FIG. 2) and the direction of mechanical vibrations corresponds to an angle $\Psi = 62°30'$. In this case a measurement error comprises $\pm 1°15'$, i.e. ¼ part of the scale division.

Visually defined in case of elliptic vibrations is a group 9 (FIG. 3) of the adjacent ellipses 6 having a maximum overlapping and a radially arranged axis 10 of symmetry shown by an arrow. The axis of symmetry may conveniently be determined by contours formed by overlapping portions of the adjacent ellipses 6 of the group 9.

Figure 3:
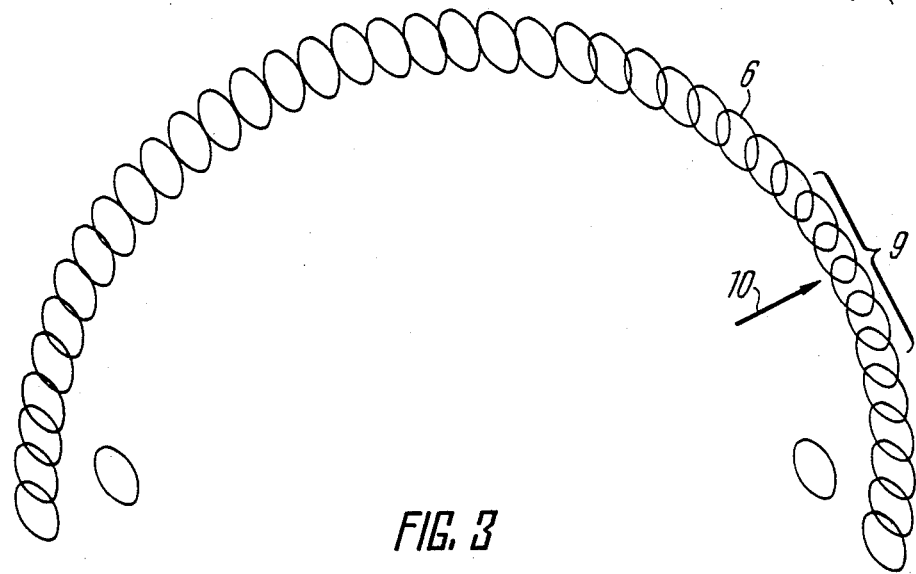
FIG. 3 illustrates a plurality of ellipses made up of points during elliptic vibrations of an object, according to the invention.

As is seen from FIG. 3, the axis 10 of symmetry passes through the ellipses 6 bearing the ordinal numbers eight and nine, and the direction of mechanical vibrations is measured as was heretofore described and also comprises $62°30' \pm 1°15'$.

An amplitude for selecting a pitch in arrangement of points is assumed to be equal to half of the major axis.

When measuring the direction of mechanical vibrations approximately equal to 90° the points 1 (FIG. 1) are arranged relative to the base line 2 so that at least the two extreme points from the points 1 (having the first ordinal number from the left-hand end of the scale and the first and second ordinal numbers from the right-hand end) forming the scale divisions are disposed on the other side of the base line 2 relative to the remaining points 1. In this case the group 7 (FIG. 2) and the group 9 (FIG. 3) incorporate respectively the segments 5 (FIG. 2) and the ellipses 6 (FIG. 3) formed during vibration of said points, and the axis 8 (FIG. 2) and the axis 10 (FIG. 3) of symmetry are close to the assumed base line 2 (FIG. 1).

A value of the scale division may suitably be selected from a range of 5° to 2.5°. If a selected value of the scale division is less than 2.5° the measurement error may not decrease due to complexity in determining the symmetry of the straight line segments or ellipses arranged in pairs.

A method of measuring the direction of mechanical vibrations in based on finding the point of tangency of the arc of a circle and the direction of vibration line on the circular scale. Visually this point is determined by the position of the axis of symmetry of the straight line segments and ellipses arranged in pairs with an equal overlapping, radially passing through this point and being normal to the direction of vibrations. The accuracy of determining the axis of symmetry governs the accuracy of measuring the direction of mechanical vibrations.

In the embodiments heretofore described, a horizontal line or a line parallel to the working surface of a vibration machine may advantageously be selected as the base line 2 (FIG. 1).

The method of measuring the direction of mechanical vibrations according to the invention makes it possible to take the measurements to a high degree of accuracy as it obviates the use of a protractor introducing an error in the process of its setting by the adjacent points especially in case of elliptic vibrations when these points are not clearly defined. The measurement error $\Delta \Psi$ comprising $\pm 1°15'$ is similar both for elliptic and rectilinear vibrations.

The method is fairly speedy, for example, it was found that the measurements on one object may be taken in the course of one minute. Besides, the vibration pattern is easily photographed for subsequent analysis and documenting.

The method is simple and does not require experience and qualification on the part of an operator, special preparatory operations and also obviates the use of instruments and appliances.

Once the card with the scale is secured to the housing of a vibration machine, it will serve long for periodic checks (diagnosis) of vibrations.

The results of measurements obtained to a high degree of accuracy and quickly make is possible to rapidly change the parameters of vibrations to provide a more accurate adjustment of the vibration machine for an optimum mode of operation in compliance, for example, with the properties and dimensions of particles of the loose material handled by the vibration machine.

What is claimed is:

1. A method of measuring the direction of mechanical vibrations in vibration machines, which comprises:
   providing a plurality of points on the surface of a vibrating object along the arc of a circle of a given radius at a constant pitch selected from a range of 1.2 to 1.8 of the amplitude of mechanical vibrations, forming a circulur scale;
   subjecting the points to rectilinear mechanical vibrations whereby the points form stroboscopically still equal straight line segments;
   visually determining a group of adjacent said straight line segments disposed at a minimum distance in the radial direction and having a radially arranged axis of symmetry;
   determining an ordinal number of at least one of said straight line segments of said group of segments through which said axis of symmetry passes, said ordinal number corresponding to an angle on said circular scale;
   and using said angle as representing a value of the measured direction of mechanical vibrations.

2. A method of measuring the direction of mechanical vibrations according to claim 1, wherein said circular scale is disposed relative to a preliminarily selected base line passing through center of the circle of said circular scale so that at least two extreme points of said points forming the divisions of said circular scale are arranged on and opposite side of said base line relative to the remaining said points.

3. A method of measuring the direction of mechanical vibrations in vibration machines, which comprises:

providing a plurality of points on the surface of a vibrating object along the arc of a circle of a given radius at a constant pitch selected from a range of 1.2 to 1.8 of the amplitude of mechanical vibrations, forming a circular scale;

subjecting the points to elliptic mechanical vibrations whereby the points form stroboscopicallly still identical ellipses;

visually determining a group of adjacent said ellipses having a maximum overlapping and a radially arranged axis of symmetry;

determining an ordinal number of at least one of said ellipses of said group of the ellipses through which said axis of symmetry passes, said ordinal number corresponding to an angle of said circular scale;

and using said angle as representing a value of the measured direction of mechanical vibrations.

4. A method of measuring the direction of mechanical vibrations according to claim 3, wherein said circular scale is disposed relative to a preliminarily selected base line passing through the center of the circle of said circular scale so that at least two extreme points of said points forming the divisions of said circular scale are arranged on an opposite side of said base line relative to remaining said points.

* * * * *